(12) United States Patent
Wan et al.

(10) Patent No.: US 8,593,523 B2
(45) Date of Patent: Nov. 26, 2013

(54) METHOD AND APPARATUS FOR CAPTURING FACIAL EXPRESSIONS

(75) Inventors: Shian Wan, Hsinchu County (TW); Yuan-Shi Liao, Taipei (TW); Yea-Shuan Huang, Hsinchu County (TW); Shun-Hsu Chuang, Yunlin County (TW)

(73) Assignee: Industrial Technology Research Institute, Hsinchu (TW)

( * ) Notice: Subject to any disclaimer, the term of this patent is extended or adjusted under 35 U.S.C. 154(b) by 107 days.

(21) Appl. No.: 13/070,489

(22) Filed: Mar. 24, 2011

(65) Prior Publication Data

US 2012/0169895 A1 Jul. 5, 2012

Related U.S. Application Data

(60) Provisional application No. 61/316,835, filed on Mar. 24, 2010.

(30) Foreign Application Priority Data

Dec. 10, 2010 (TW) .............................. 99143386 A

(51) Int. Cl.
- *H04N 5/225* (2006.01)
- *H04N 5/228* (2006.01)
- *G06K 9/00* (2006.01)
- *G06K 9/46* (2006.01)
- *G06K 9/66* (2006.01)
- *G06K 9/36* (2006.01)

(52) U.S. Cl.
USPC ........ 348/169; 348/222.1; 382/103; 382/115; 382/117; 382/291; 382/190

(58) Field of Classification Search
USPC ............... 348/222.1, 169–172; 382/115–157, 382/181–231, 103, 286–291
See application file for complete search history.

(56) References Cited

U.S. PATENT DOCUMENTS

| | | | | |
|---|---|---|---|---|
| 5,987,154 A | * | 11/1999 | Gibbon et al. | 382/115 |
| 6,879,709 B2 | * | 4/2005 | Tian et al. | 382/118 |
| 7,391,887 B2 | * | 6/2008 | Durnell | 382/117 |
| 7,636,453 B2 | * | 12/2009 | Porter et al. | 382/103 |
| 7,751,599 B2 | * | 7/2010 | Chen et al. | 382/118 |
| 7,853,050 B2 | * | 12/2010 | Wang et al. | 382/118 |
| 2004/0005083 A1 | * | 1/2004 | Fujimura et al. | 382/103 |

(Continued)

FOREIGN PATENT DOCUMENTS

| TW | 200829014 | 7/2008 |
|---|---|---|
| TW | 200832285 | 8/2008 |
| TW | 200943197 | 10/2009 |

*Primary Examiner* — Chia-Wei A Chen
(74) *Attorney, Agent, or Firm* — Jianq Chyun IP Office

(57) ABSTRACT

A method and an apparatus for capturing facial expressions are provided, in which different facial expressions of a user are captured through a face recognition technique. In the method, a plurality of sequentially captured images containing human faces is received. Regional features of the human faces in the images are respectively captured to generate a target feature vector. The target feature vector is compared with a plurality of previously stored feature vectors to generate a parameter value. When the parameter value is higher than a threshold, one of the images is selected as a target image. Moreover, a facial expression recognition and classification procedures can be further performed. For example, the target image is recognized to obtain a facial expression state, and the image is classified according to the facial expression state.

9 Claims, 6 Drawing Sheets

(56) References Cited

U.S. PATENT DOCUMENTS

| | | |
|---|---|---|
| 2006/0056667 A1 | 3/2006 | Waters |
| 2006/0110014 A1 | 5/2006 | Philomin et al. |
| 2006/0115157 A1* | 6/2006 | Mori et al. .................... 382/190 |
| 2008/0037836 A1* | 2/2008 | Chen et al. .................... 382/118 |
| 2008/0167820 A1* | 7/2008 | Oguchi et al. ................. 701/301 |
| 2008/0273766 A1* | 11/2008 | Kim et al. ..................... 382/118 |
| 2009/0051785 A1* | 2/2009 | Kamada et al. ............ 348/231.5 |
| 2009/0087036 A1* | 4/2009 | Imaoka ......................... 382/118 |
| 2009/0087099 A1* | 4/2009 | Nakamura .................... 382/190 |
| 2009/0190803 A1* | 7/2009 | Neghina et al. ............... 382/118 |
| 2009/0190834 A1* | 7/2009 | Inoue ............................ 382/181 |
| 2009/0285456 A1* | 11/2009 | Moon et al. ................... 382/118 |
| 2010/0073503 A1* | 3/2010 | Tanaka et al. .............. 348/222.1 |
| 2010/0079613 A1* | 4/2010 | Karimoto et al. .......... 348/222.1 |
| 2010/0091087 A1* | 4/2010 | Takizawa ................... 348/14.14 |
| 2010/0118163 A1* | 5/2010 | Matsugu et al. ......... 348/231.99 |
| 2010/0135532 A1* | 6/2010 | Nakagomi .................... 382/103 |
| 2010/0189358 A1* | 7/2010 | Kaneda et al. ................ 382/195 |
| 2011/0007174 A1* | 1/2011 | Bacivarov et al. ......... 348/222.1 |
| 2011/0216216 A1* | 9/2011 | Ogawa ....................... 348/222.1 |
| 2011/0216217 A1* | 9/2011 | Ogawa ....................... 348/222.1 |
| 2011/0216218 A1* | 9/2011 | Ogawa ....................... 348/222.1 |
| 2012/0082384 A1 | 4/2012 | Kaneda et al. ................ 382/195 |

* cited by examiner

METHOD AND APPARATUS FOR CAPTURING FACIAL EXPRESSIONS

CROSS-REFERENCE TO RELATED APPLICATION

This application claims the benefit of U.S. Provisional Application No. 61/316,835, filed Mar. 24, 2010, and also claims the priority benefit of Taiwan patent application serial no. 99143386, filed Dec. 10, 2010. The entirety of the above-mentioned patent applications is hereby incorporated by reference herein and made a part of this specification.

TECHNICAL FIELD

The disclosure relates to a method and an apparatus for capturing facial expressions.

BACKGROUND

Digital cameras have become one of the most indispensable tools in our daily life along with the development and widespread thereof. Unlike the conventional film cameras, digital cameras can be used for continuously capturing images. Besides, images captured by a digital camera can be viewed in real time so that they can be deleted any time. Generally speaking, images captured by using a digital camera (especially those of children) may not be satisfactory. As to children, their many expressions (smiling, crying, or even grimace) are all precious memories to their parents. Accordingly, a user usually takes several continuous images at one time and then selects the most satisfactory image from all the captured images.

However, it is very time-consuming and troublesome to the user to select images, and people tend to feel uneasy in front of digital cameras. Thus, it is very difficult to capture good images with vivid facial expressions. Parents also have difficulty to take care of children and take pictures at the same time. Besides, children tend to show their true feelings when faced with toys (especially interactive toys) but limited expressions when faced with cameras and instructions of adults.

SUMMARY

A method and an apparatus for capturing facial expressions are introduced herein.

In one of embodiments, a facial image capturing method is provided. In the present method, a plurality of sequentially captured images comprising human faces is received. Regional features of the human faces in the images are respectively obtained to generate a target feature vector. The target feature vector is compared with a plurality of previously stored feature vectors to generate a parameter value. When the parameter value is higher than a predetermined threshold, one of the sequentially captured images is selected as a target image. Besides, the target feature vector corresponding to the target image is added to be a new feature vector for comparing with a next target feature vector.

In one of embodiments, a facial image capturing apparatus including an image-capturing unit, a feature-point-positioning unit, and a specific-expression-determination unit is provided. The image-capturing unit sequentially captures a plurality of images comprising human faces. The feature-point-positioning unit receives the sequentially captured images and generates a target feature vector according to regional features of the human faces in the images. The specific-expression-determination unit receives the target feature vector and compares the target feature vector with a plurality of previously stored feature vectors to generate a parameter value. When the parameter value is higher than a predetermined threshold, the specific-expression-determination unit selects one of the sequentially captured images as a target image. The specific-expression-classification unit adds the target feature vector corresponding to the target image as a new feature vector for comparing with next target feature vector.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DETAILED DESCRIPTION OF DISCLOSED EMBODIMENTS

The disclosure provides an image capturing method and an image capturing apparatus, wherein different facial expressions of a user are captured through a face recognition technique.

In order to make captured images of human faces to be specific and use the images for various purposes (for example, exceptional expression record and facial expression recognition), the method described below can be adopted to select the specific images. Thus, the determination of specific images or specific expressions defined in the disclosure is not limited to the determination of the predefined expressions, for example, smiling, angry, sad, etc. Instead, images having different expressional features in comparison with images which are already saved in the database are captured. In other words, any newly captured image is fresh to the apparatus. And these specific images or images with specific expressions are images to be stored by the method and apparatus provided by the disclosure.

After an image capturing apparatus captures images, each of the images is positioned through an image-positioning procedure. For example, in an embodiment, an eye-feature-point-positioning procedure may be adopted. In order to prevent any error caused by inaccurate eye positioning or positioning mistakes, several images are captured in one time interval and these continuously captured images are recognized together to reduce the risk of misidentification of specific images caused by inaccurate feature point positioning.

The image-positioning procedure will be described in detail below.

Figure 1:
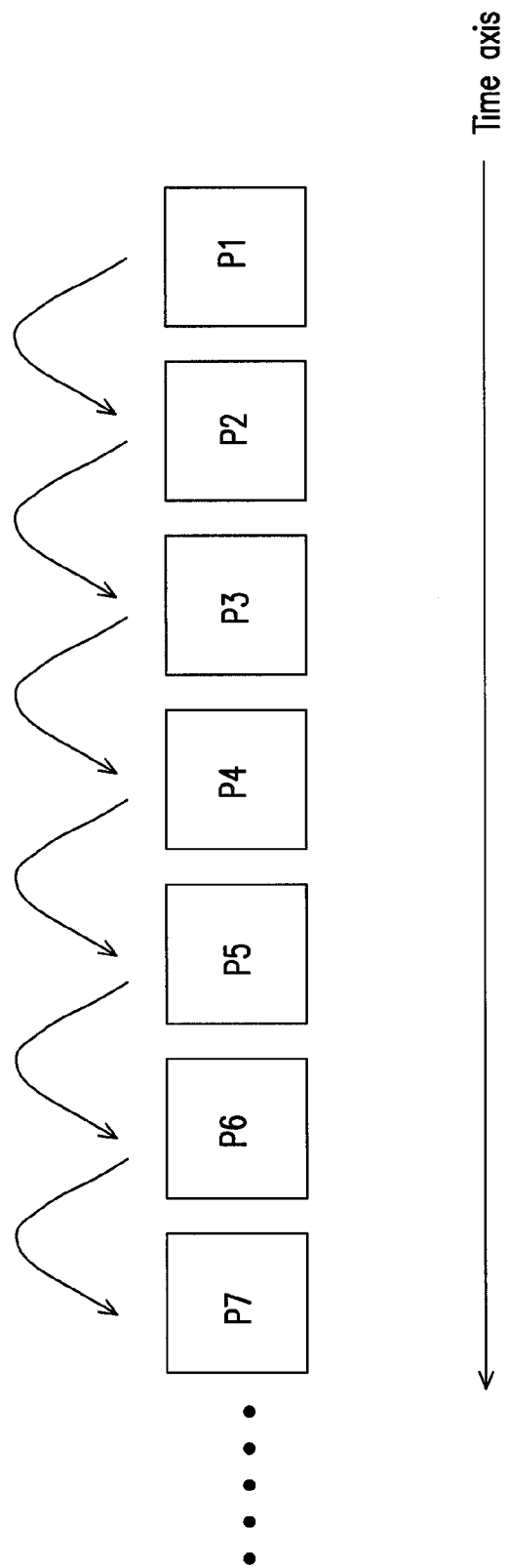
FIG. 1 is a diagram illustrating how a plurality of continuous images is captured for determining whether the displacement of a feature point is too large.

In one embodiment, at first, n images are sequentially captured and n=5 for example. An eye feature point is captured in each of the n images. Then, the positions of the feature point in two consecutive images are compared. When the positions of the feature point in the two consecutive images are very different, it is determined that the feature point is lost or wrongly captured. Hence the latter image is invalid in this case. This image will be discarded and not be counted. A new image will be appended to the end of the sequence of n−1 images then make the total as n images. Eventually, when the feature points of the n accumulated images are all correct, one of the images (for example, the median one) is selected for specific expression determination. The n continuous images in FIG. 1 can be used for determining whether the displacement of the feature point is too large. The blocks represent the captured images. For example, the blocks represent continuously captured images P1-P7, and the displacement of feature point in consecutive images is determined. In an embodiment, the displacement may be expressed with following expressions:

$$\frac{d(curr_{leye} - prev_{leye})}{two\_eye\_avg} < 0.25 \quad (S1)$$

$$\frac{d(curr_{reye} - prev_{reye})}{two\_eye\_avg} < 0.25 \quad (S2)$$

In foregoing expressions, $curr_{leye}$ and $curr_{reye}$ are respectively the coordinates of the left eye and the right eye in the current image, $prev_{leye}$ and $prev_{reye}$ are respectively the coordinates of the left eye and the right eye in a previous image, two_eye_avg is the average distance between the two eyes in the 5 images, and d(x) is Euclidean distance. When all the captured images satisfy foregoing conditions, one of the images is selected for specific expression determination.

Euclidean distance:

To the two vectors X=[x1,x2] and Y=[y1,y2], $$d(X,Y) = \sqrt{(x1-y1)^2 + (x2-y2)^2}.$$

Foregoing example with eye-feature-point positioning is only an embodiment of the disclosure, and it is within the scope of the disclosure as long as the image processing method can increase positioning accuracy and reduce the risk of misjudgment of specific images. Foregoing eye feature point positioning technique adopts 5 images and a plurality of deviation-determination values (DDVs). For example, in foregoing expressions S1 and S2, two deviation-determination values are preset to be the same (0.25). Besides, the Euclidean distance is also one of a plurality of embodiments. In another embodiment, different number of images or different deviation-determination values may also be adopted in different modes. For example, parameters are adjusted in different modes in which an object (the object of which the images are to be captured) moves quickly or slowly.

Figure 2:
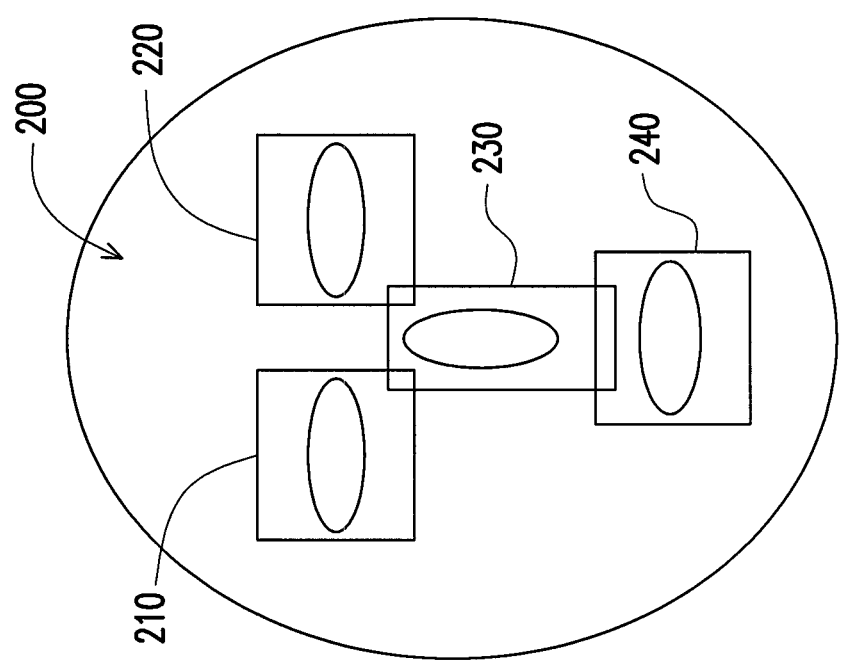
FIG. 2 is a diagram illustrating partition feature regions on a human face.

Then, one of the sequentially captured images is selected for specific expression determination. An embodiment of the disclosure provides a specific expression determination method. FIG. 2 illustrates how the feature regions on a human face are partitioned according to an embodiment. In the facial image 200 of the selected image, the human face is partitioned into a plurality of regions. For example, in an embodiment, the human face is partitioned into a left eye region 210 and a right eye region 220, a nose region 230, and a mouth region 240. A facial region is first captured from the image according to the coordinates of both eyes. After that, a feature (for example, brightness, texture, or light projection) is captured from each of the corresponding regions (in the present embodiment, four regions are processed).

First, features are respectively captured from the left eye region 210, the right eye region 220, the nose region 230, and the mouth region 240. Then, the features of these four regions are integrated to form a target feature vector, and the target feature vector is input into a feature database. In the feature database, the target feature vector is compared with previously stored feature vectors. If there is no similar feature vector is found, the target feature vector is recorded, and the current selected image is determined to be a specific image. In other embodiments, the target feature vector may also be formed by combining the features of two or more regions. In another embodiments, the target feature vector may also be formed by averaging (for example, by arithmetic averaging) the features of these four regions of these five images.

Figure 3:
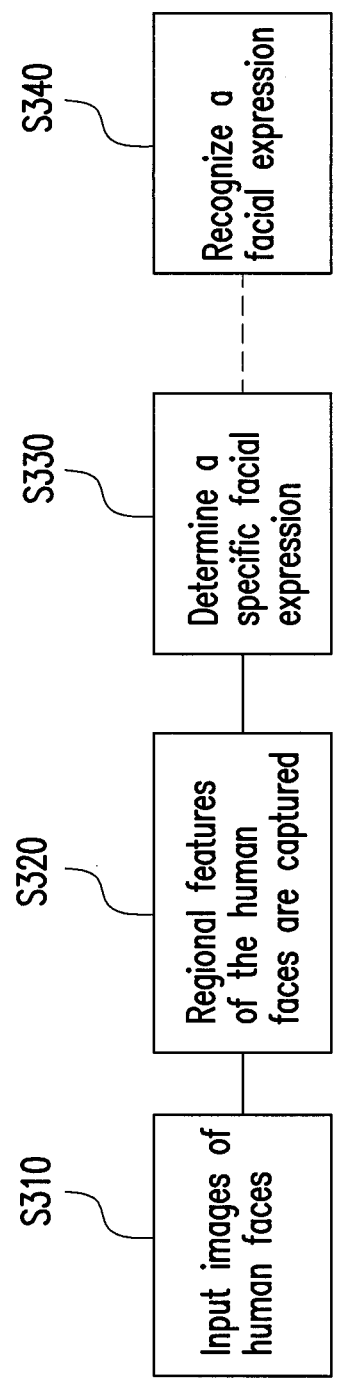
FIG. 3 is a flowchart of a specific expression determination method according to an embodiment of the disclosure.

FIG. 3 is a flowchart of a specific expression determination method according to an embodiment of the disclosure. In step S310, a facial image is received. Then, in step S320, regional features on the human face are captured. For example, facial regions are captured according to the coordinates of both eyes. Next, the features (for example, brightness, texture, or light projection) of a plurality of corresponding regions on the image are captured. Thereafter, in step S330, a specific expression is determined. Namely, the generated target feature vector is compared with the previously stored feature vectors, wherein the previously stored feature vectors may be stored in a specifically designed analysis unit such as a database in a memory or a general memory. If there is no similar feature vector found, the current target feature vector is recorded, and the input selected image is determined to be a specific image. Besides, the target feature vector corresponding to the specific image is added into the previously stored feature vectors.

The specific-expression-determination method by comparing the target feature vector with the previously stored feature vectors is described as following. Herein it is assumed that $f^{left-eye}$ is the feature vector corresponding to the left eye region, and the dimension thereof is $n^{left-eye}$;

$f^{right-eye}$ is the feature vector corresponding to the right eye region, and the dimension thereof is $n^{right-eye}$;

$f^{nose}$ is the feature vector corresponding to the nose region, and the dimension thereof is $n^{nose}$;

$f^{mouth}$ is the feature vector corresponding to the mouth region, and the dimension thereof is $n^{mouth}$;

$f^{total}$ is the feature vector corresponding to the left eye region, the right eye region, the nose region, and the mouth region, and the dimension thereof is $n^{total}$;

i.e., $$f^{total} = f^{left-eye} + f^{right-eye} + f^{nose} + f^{mouth}, \text{ and}$$

$$n^{total} = n^{left-eye} + n^{right-eye} + n^{nose} + n^{mouth}$$

$Q = \{f_1^{total}, f_2^{total}, \ldots, f_q^{total}\}$ is a previously recorded specific expression feature vector set, wherein $f_i^{total}$ is the target feature vector corresponding to the $i^{th}$ specific expression, q is the number of recorded specific expressions, and Q is initially an empty set When n valid facial images are captured, one of the images is selected for generating the target feature vector $f_{target}^{total}$ of the image. After that, the distance from the target feature vector $f_{target}^{total}$ to each specific expression feature vector in the set Q is respectively calculated with following expression:

$$D(i) = \sum_{j=1}^{n_{total}} (f_{i,j}^{total} - f_{target,j}^{total})^2,$$

wherein $f_{i,j}^{total}$ is the $j^{th}$ feature measurement value of the $i^{th}$ specific image, and $f_{target,j}^{total}$ is the $j^{th}$ feature measurement value of the target image.

When each D(i) is higher than the predetermined threshold, the target image is determined to be a new specific image, and following operations are performed to add the target feature vector corresponding to this new specific image into the specific expression feature vector set Q:

$$f_{q+1}^{total} = f_{target}^{total}$$

$$Q = \{f_1^{total}, f_2^{total}, \ldots, f_q^{total}, f_{q+1}^{total}\}$$

$$q = q+1;$$

In foregoing step S330 of the specific expression determination method, different types of images containing different facial features are identified, and these specific images or images containing specific expressions are images to be stored by the method and apparatus provided by the disclosure.

In another exemplary embodiment of the disclosure, the specific expression determination method further includes an expression recognition procedure, as step S340 illustrated in FIG. 3.

The facial expression recognition procedure in step S340 can be performed when an image is determined to be an image containing a specific expression. The facial expression recognition procedure is performed to identify expressions reflecting different moods, such as anger, terror, dislike, happiness, expressionless, sadness, and surprise. In an embodiment, a recognizer may be adopted, such as a Hierarchical Temporal Memory (HTM) recognizer. This technique is to simulate the operation of Neocortex in human brain, and the recognizer can distinguish several types of expressions, such as anger, terror, dislike, happiness, expressionless, sadness, and surprise.

Figure 4A:
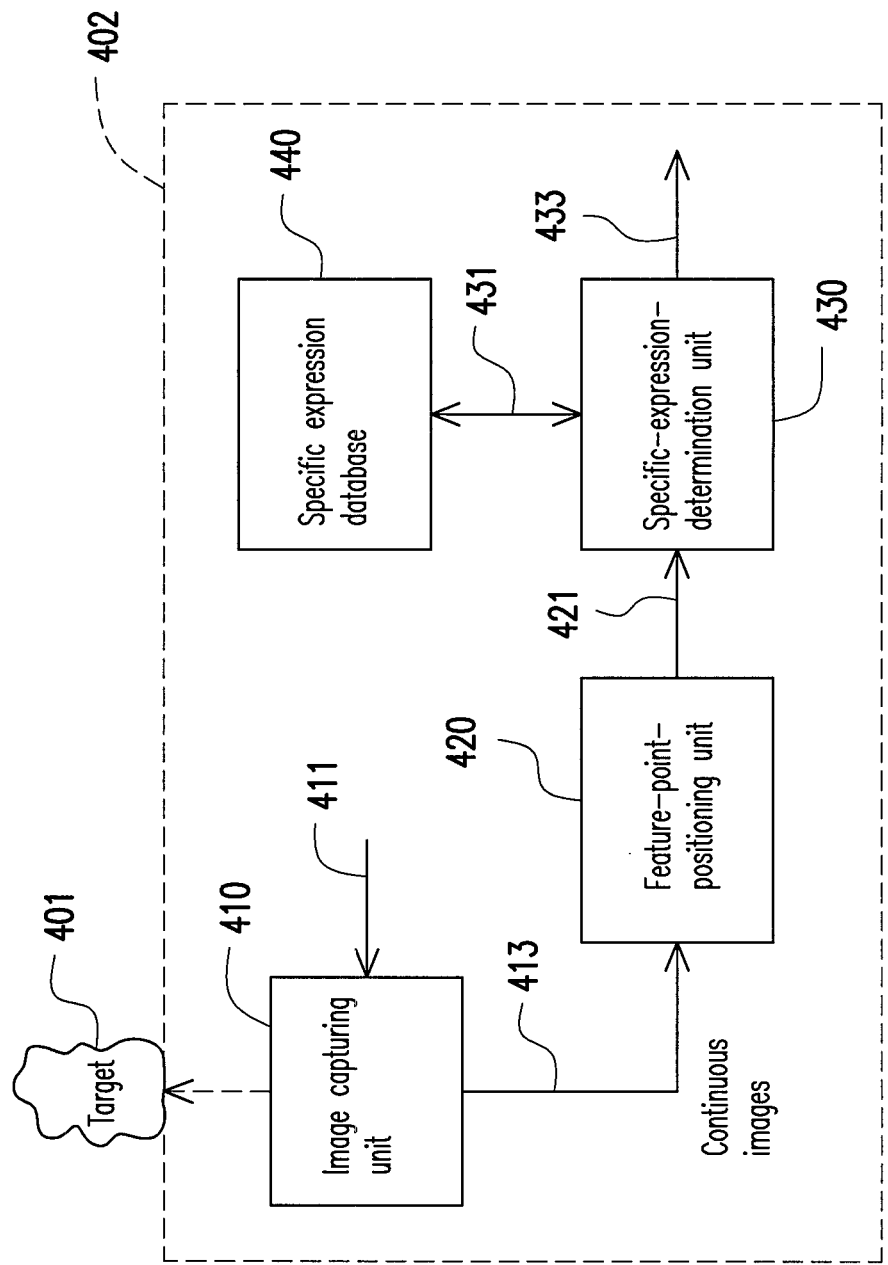
FIG. 4A is a diagram illustrating a system for capturing images through a face recognition technique according to an exemplary embodiment.

FIG. 4A is a diagram illustrating a system for capturing images through a face recognition technique according to an exemplary embodiment. The image capturing system 400 includes an image processing apparatus 402.

The image processing apparatus 402 includes an image capturing unit 410, a feature-point-positioning unit 420, and a specific-expression-determination unit 430. The image capturing unit 410 may be a digital camera, a video camera, a web camera, an IP camera, or a surveillance camera.

The image capturing apparatus 410 continuously captures a plurality of images of a target 401. Then, the continuous images are positioned. Whether facial expression recognition should be performed on these continuous images is determined by performing an feature-point-positioning procedure (for example, the aforementioned eye feature point positioning technique) on these images first. The images may be positioned by using the Euclidean distance formula, wherein the coordinates of the left and right eyes in both a current image and a previous image are calculated, and after calculating an average distance between both eyes in these image, whether facial expression recognition is to be performed is determined according to a deviation-determination value (for example, 0.25 as above). If the facial expression recognition is to be performed, one of the images is selected and sent to the specific-expression-determination unit 430.

Next, the specific-expression-determination unit 430 partitions facial features into different regions on the human faces in the images. For example, the facial regions are captured from the images according to the coordinates of both eyes. After capturing the facial regions, the features (for example, brightness, texture, or light projection) of a plurality of corresponding regions in the images are captured. Then, the features of the regions are integrated to form a target feature vector.

Figure 4B:
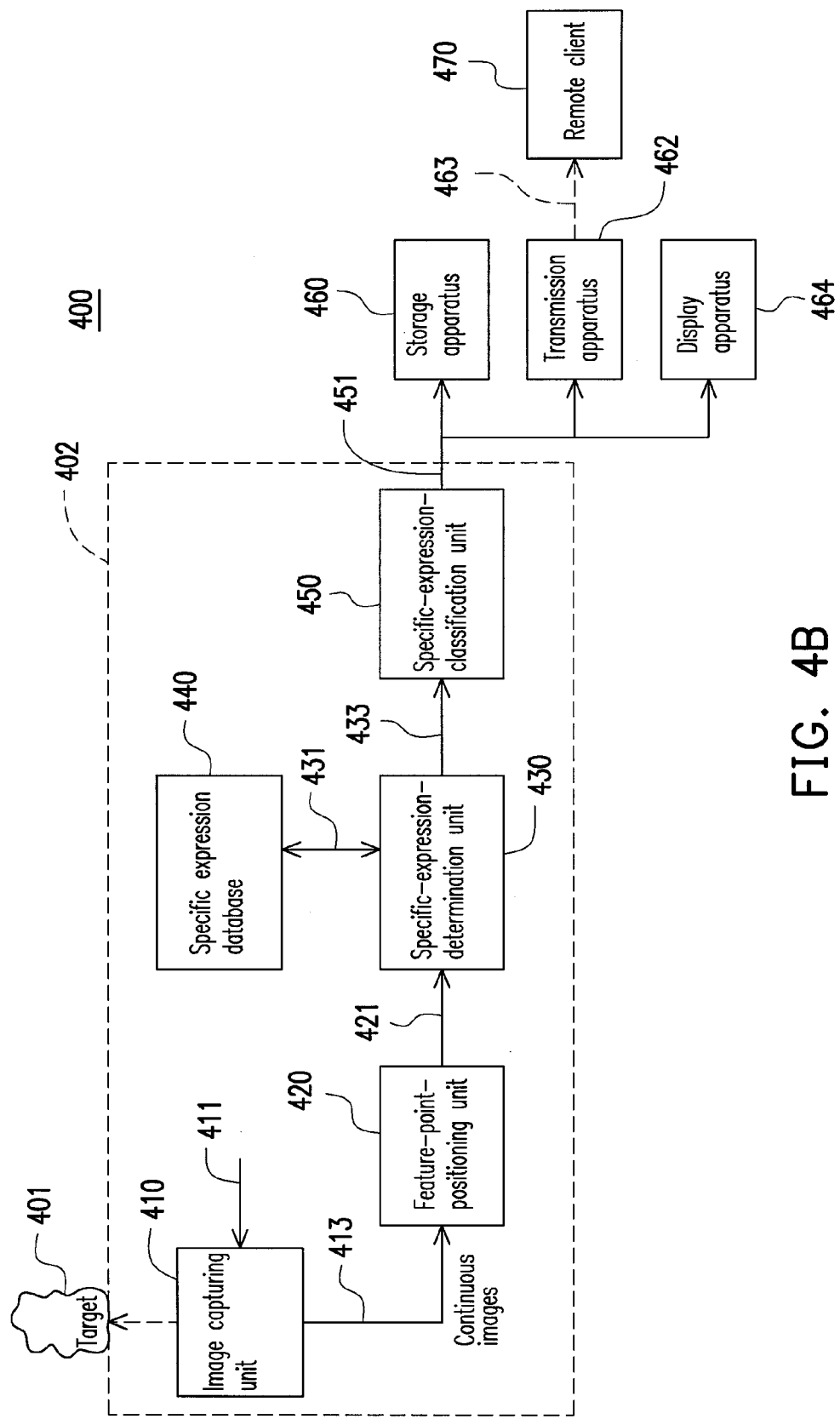
FIG. 4B is a diagram illustrating a system for capturing images through a face recognition technique according to another exemplary embodiment.

FIG. 4B is a diagram illustrating a system for capturing images through a face recognition technique according to another exemplary embodiment. Referring to FIG. 4B, besides the image processing apparatus 402, the image capturing system 400 further includes a storage apparatus 460, a remote client 470 connected through a transmission apparatus 462, and a display apparatus 464.

The image capturing unit 410, the feature-point-positioning unit 420, and the specific-expression-determination unit 430 of the image processing apparatus 402 have been described above with reference to FIG. 4A therefore will not be described herein.

Thereafter, the specific-expression-determination unit 430 reads the feature vectors stored in the specific expression database 440. The target feature vector is compared with the stored feature vectors. If no similar feature vector is found, the target feature vector is recorded and stored into the specific expression database 440. Besides, the input image is determined to be a specific image, and for example, sent to the specific-expression-classification unit 450 through the transmission channel 433.

In an embodiment, the specific expression classification unit 450 is implemented by using a recognizer, such as a HTM recognizer. The recognizer determines the type of the specific expression (for example, anger, terror, dislike, happiness, expressionless, sadness, or surprise) in the specific image. The result 451 obtained by the recognizer is stored into the storage apparatus 460 or transmitted to the remote client 470 through the transmission apparatus 462 or any other transmission channel, such as a physical connection, a communication network, or the Internet. The result 451 may also be sent to the display apparatus 464 to be displayed.

In an embodiment, as shown in FIG. 4A, the image processing apparatus may include an image capturing apparatus, a feature point positioning unit, a specific-expression-determination unit, and a specific-expression-classification unit. In another embodiment, the image processing apparatus may further include a storage apparatus for storing the specific expression database. In yet another embodiment, as shown in FIG. 4B, the image processing apparatus may also include only the image capturing apparatus for sending the captured images to the backend system through a wireless network, Bluetooth communication, or physical connection. The backend system may include a feature point positioning unit, a specific-expression-determination unit, and a specific-expression-classification unit. The image capturing apparatus may be a digital camera, a video camera, a web camera, an IP camera, or a surveillance camera.

The image capturing image 400 can be applied for capturing images of specific expressions of infants so that the parents can obtain a precious record of their children's growth. In addition, the image capturing image 400 may also be applied as a children or elder caring surveillance system so that the paramedical staffs can obtain information of any specific event in real time through a specific expression detection function.

Figure 5:
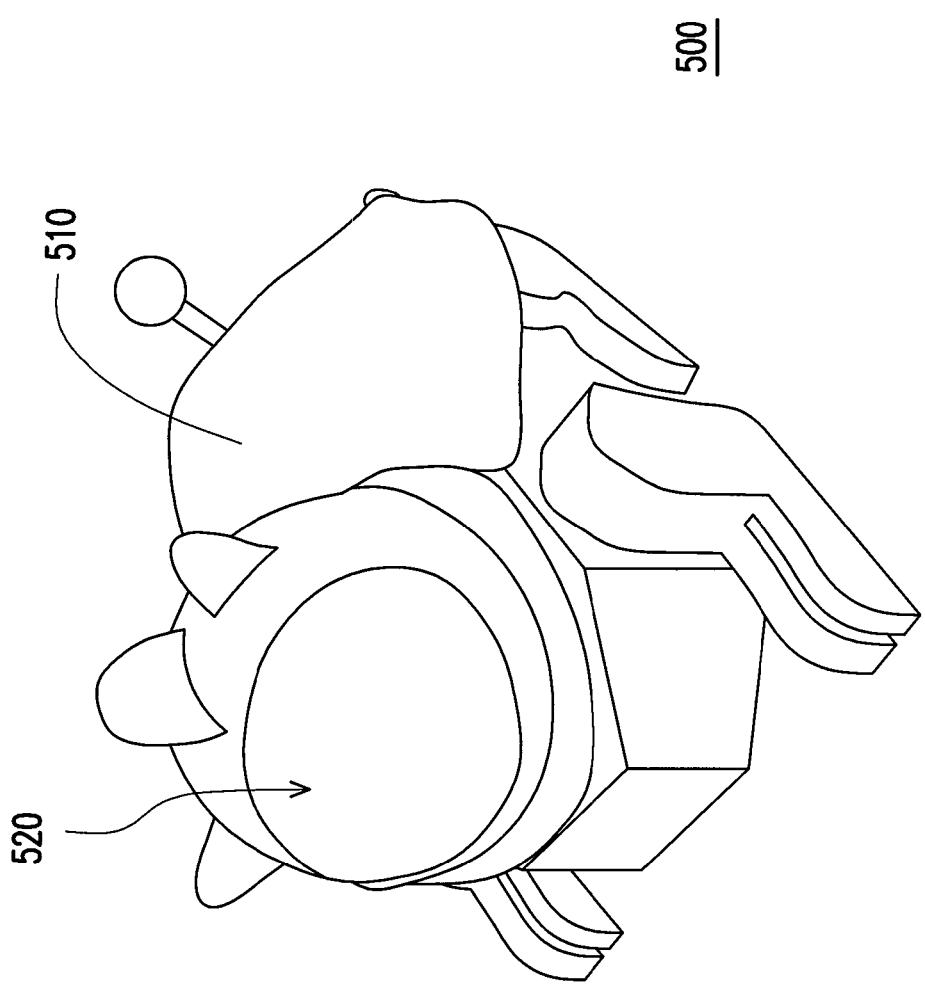
FIG. 5 is a diagram illustrating a product disposed with an image processing apparatus.

FIG. 5 is a diagram illustrating a product having an interesting appearance (for example, an electronic pet, a toy robot, or any other product that interests a user) disposed with the image processing apparatus illustrated in FIG. 4A or FIG. 4B. One purpose of disposing the image processing apparatus into a product having an interesting appearance is to attract the attention of the target of which the images are to be captured (for example, an infant) and make the expressions of the target more natural. As shown in FIG. 5, the product 500 has a main body 510 and a transparent cover 520. The image processing apparatus is disposed behind the transparent cover 520. The image processing apparatus captures different images of a user through the transparent cover 520 and sends the processed images to the backend system.

In aforesaid embodiments or some other embodiments according to the disclosure, an image capturing method and an image capturing apparatus are introduced. The concept of the image capturing method or apparatus is to simulate a manner of taking pictures by a professional cameraman or simulate effects thereof. The professional cameraman will carefully watch any activity or motions of an aiming target (like "sampling and comparing captured pictures" in the disclosure). Whenever the aimed target (for example, a kid) has any special or extraordinary activity, for example, facial expressions, the professional cameraman will simultaneously press the shutter of the camera to catch the activity of the target without missing any valuable and highlight pictures with such activity. For some reasons such as saving the resource (i.e. capacity of memory cards) or avoid wasting time to pick desired pictures, the professional cameraman will not be interested in taking pictures for normal or ordinary activities of the target.

Following the aforesaid manner by the professional cameraman, in the introduced image capturing method or apparatus of one of the embodiment of the disclosure, the captured pictures will be filtered through comparing the existed pictures. For example, the human faces in the captured pictures will be analyzed and a part of facial expressions of the human faces will be compared with the existed and stored expressions. If some special or extraordinary expressions are found, or the facial expressions are not being stored before (i.e. expressions never being saw or new to the existed pictures), these pictures with such facial expressions will be stored in the database. Furthermore, these facial expressions are not limited to be cataloged as only happy, angry, sad or smiling expressions by a specific formula, but also some strange/interesting/meaningful/commemoratory expressions which are worth of remember or recording by the user.

In order to make captured images of human faces to be specific and use the pictures for various purposes (for example, exceptional expression record and facial expression recognition), the method described above may be adopted to select the specific pictures. Thus, the determination of specific pictures or specific expressions defined in the disclosure is not limited to the determination of smiling expression. Instead, pictures having different expressional features are categorized, and these specific pictures or pictures with specific expressions are pictures to be stored by the method and apparatus provided by the disclosure.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A facial image capturing method, comprising:
receiving a plurality of captured images including human faces;
obtaining regional features of the human faces from the captured images, and generating a target feature vector by a feature-point-positioning procedure on the captured images, wherein a plurality of deviation-determination values are obtained therefrom and one of the captured images is selected for generating the target feature vector, wherein the target feature vector is generated according to a displacement analysis of the captured images, and wherein the displacement is generated according to a difference between coordinates of a left eye in the image currently processed and a left eye in the image previously processed as well as a difference between coordinates of a right eye in the image currently processed and a right eye in the image previously processed;
comparing the target feature vector with a plurality of previously stored feature vectors, and generating a parameter value accordingly, wherein when the parameter value is higher than a threshold, one of the captured images is selected as a target image, and the target feature vector corresponding to the target image is stored to be as a new feature vector for comparing with next target feature vector; and
recognizing the target image to obtain a facial expression state and classifying the target image according to the facial expression state.

2. The facial image capturing method according to claim 1, wherein each of the images is processed by using following expressions:

$$\frac{d(curr_{leye} - prev_{leye})}{two\_eye\_avg} < \text{first deviation} - \text{determination value}$$

$$\frac{d(curr_{reye} - prev_{reye})}{two\_eye\_avg} < \text{second deviation} - \text{determination value}$$

wherein $curr_{leye}$ and $curr_{reye}$ are respectively coordinates of the left eye and the right eye of the human face in the image currently processed, $prev_{leye}$ and $prev_{reye}$ are respectively coordinates of the left eye and the right eye of the human face in the image previously processed, $two\_eye\_avg$ is an average distance between two eyes of the human faces in all the captured images, $d(x)$ is an Euclidean distance, and the first deviation-determination value and the second deviation-determination value are predetermined.

3. The facial image capturing method according to claim 1, wherein the step of comparing the target feature vector with the previously stored feature vectors comprises:
constructing a multi-dimensional feature vector as the target feature vector according to a portion or all of a left eye block, a right eye block, a nose block, and a mouth block of the human face; and
comparing the multi-dimensional feature vector with the previously stored feature vectors to obtain the parameter value.

4. The facial image capturing method according to claim 1, wherein the target image is recognized through a Hierarchical Temporal Memory (HTM) recognition technique.

5. A facial image capturing apparatus, comprising:
an image capturing unit, for capturing a plurality of images comprising human faces;

a feature-point-positioning unit, for receiving the captured images and generating a target feature vector according to regional features of the human faces in the images, wherein by a feature-point-positioning procedure is performed by the feature-point-positioning unit on the captured images, and a plurality of deviation-determination values are obtained therefrom and one of the captured images is selected for generating the target feature vector, wherein the target feature vector is generated according to a displacement analysis of the captured images, and wherein the displacement is generated according to a difference between coordinates of a left eye in the image currently processed and a left eye in the image previously processed as well as a difference between coordinates of a right eye in the image currently processed and a right eye in the image previously processed; and an analysis unit , for receiving the target feature vector and comparing the target feature vector with a plurality of previously stored feature vectors to generate a parameter value, wherein when the parameter value is higher than a threshold, the analysis unit selects one of the images as a target image and adds the target feature vector corresponding to the target image into the feature vectors; and a specific-expression-classification unit, wherein the specific-expression-classification unit recognizes the target image to obtain a facial expression state and classifies the target image according to the facial expression state.

6. The facial image capturing apparatus according to claim 5, wherein the image capturing unit is a digital camera, a video camera, a web camera, an IP camera, or a surveillance camera.

7. The facial image capturing apparatus according to claim 5, wherein each of the images is processed by using following expressions:

$$\frac{d(curr_{leye} - prev_{leye})}{two\_eye\_avg} < \text{first deviation} - \text{determination value}$$

$$\frac{d(curr_{reye} - prev_{reye})}{two\_eye\_avg} < \text{second deviation} - \text{determination value,}$$

wherein currleye and currreye are respectively coordinates of the left eye and the right eye of the human face in the image currently processed, prevleye and prevreye are respectively coordinates of the left eye and the right eye of the human face in the image previously processed, $two_{13}eye\_avg$ is an average distance between two eyes of the human faces in all the images, d(x) is an Euclidean distance, and the first deviation-determination value and the second deviation-determination value are predetermined.

8. The facial image capturing apparatus according to claim 5, wherein the target feature vector is compared with the previously stored feature vectors by constructing a multi-dimensional feature vector according to one or all of a left eye block, a right eye block, a nose block, and a mouth block of the human face and comparing the multi-dimensional feature vector with the previously stored feature vectors to obtain the parameter value.

9. The facial image capturing apparatus according to claim 5, wherein the specific-expression-classification unit further comprises a recognizer, and the recognizer adopts a HTM recognition technique.

* * * * *